United States Patent
Huang et al.

(10) Patent No.: US 9,388,917 B2
(45) Date of Patent: Jul. 12, 2016

(54) PIPELINE FREESPAN SUPPORT

(71) Applicant: DMAR ENGINEERING, INC., Houston, TX (US)

(72) Inventors: Zhiming Huang, Missouri City, TX (US); Dagang Zhang, Houston, TX (US)

(73) Assignee: DMAR Engineering, Inc., Houston, TX (US)

( * ) Notice: Subject to any disclaimer, the term of this patent is extended or adjusted under 35 U.S.C. 154(b) by 0 days.

(21) Appl. No.: 14/286,991

(22) Filed: May 24, 2014

(65) Prior Publication Data
US 2015/0337988 A1    Nov. 26, 2015

(51) Int. Cl.
| F16L 1/20 | (2006.01) |
| F16L 3/22 | (2006.01) |
| F16L 1/14 | (2006.01) |
| F16L 1/16 | (2006.01) |
| E04G 1/06 | (2006.01) |
| F16L 1/12 | (2006.01) |
| F16L 3/02 | (2006.01) |

(52) U.S. Cl.
CPC ... F16L 1/14 (2013.01); E04G 1/06 (2013.01); F16L 1/123 (2013.01); F16L 1/16 (2013.01); F16L 1/20 (2013.01); F16L 3/02 (2013.01); F16L 3/22 (2013.01)

(58) Field of Classification Search
CPC .................................... F16L 3/00; F16L 3/16
USPC .......................................... 405/184.4; 248/49
See application file for complete search history.

(56) References Cited

U.S. PATENT DOCUMENTS

| 3,303,937 | A | * | 2/1967 | McConnell | 211/192 |
| 3,648,982 | A | * | 3/1972 | Sabel | E04F 11/1834 256/22 |
| 3,749,429 | A | * | 7/1973 | Hauber | E21B 43/0107 403/385 |
| 4,139,142 | A | * | 2/1979 | Maple et al. | 228/175 |
| 4,140,292 | A | * | 2/1979 | Kaigler, Jr. | 248/49 |
| 4,355,925 | A | * | 10/1982 | Rognoni | 405/172 |
| 5,026,028 | A | * | 6/1991 | Ooi | E04F 11/1834 248/251 |
| 5,163,642 | A | * | 11/1992 | Torrens et al. | 248/49 |
| 6,061,984 | A | * | 5/2000 | Rose | 52/220.1 |
| 7,121,530 | B1 | * | 10/2006 | Preta | E04H 17/1413 256/65.01 |

* cited by examiner

*Primary Examiner* — Tara M. Pinnock
(74) *Attorney, Agent, or Firm* — Liaoteng Wang

(57) ABSTRACT

Apparatus and methods related to pipeline freespan support are described. For example, some embodiments may contain an upper structure, which contains at least four legs connected to one another by a number of bracing members, and a number of attachment points through which the upper structure can be lifted, and a lower structure, which contains at least four posts that can be connected to, and disconnected from as needed, the four legs of the upper structure, two spaced mud mats on which the posts stand, and at least two horizontal arms that can be attached to the posts, rotate about the posts, connect to and be locked with the posts on the other mud mat, and be lifted to an appropriate height to provide suitable support at the pipeline freespan location.

10 Claims, 6 Drawing Sheets

PIPELINE FREESPAN SUPPORT

FIELD OF PRESENT DISCLOSURE

This present disclosure relates to pipeline freespan support.

BACKGROUND INFORMATION

Pipeline freespans commonly arise under uneven seabed topography conditions. Long freespans could introduce strength and fatigue concerns to the pipeline, and require artificial supports to ensure the pipeline stability. Grout bags are usually used for shallow-water pipeline freespan supports. However, grout bags require supply hoses to connect the grout bags and surface vessels in order to fill them. When water depth increases, the grout bag supply hoses become a constraint, making the use of grout bags as freespan supports more difficult and costly. Apparatus and methods have been proposed to provide support to pipelines at the freespan locations.

DETAILED DESCRIPTION

Figure 1:
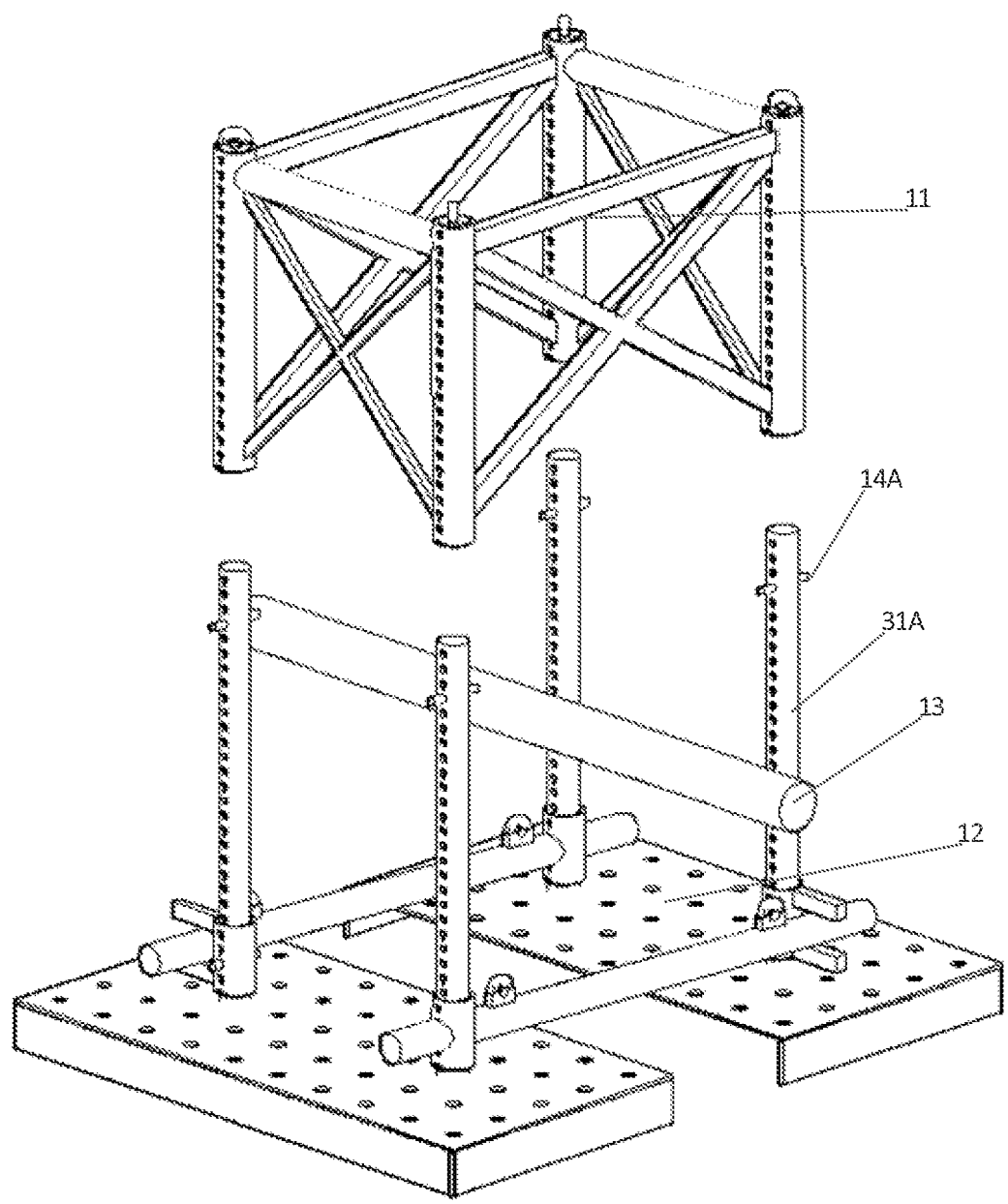
FIG. 1 is a diagram showing the overview of an embodiment of the pipeline freespan support, comprising an upper structure and a lower structure, with a pipeline going through the lower structure.

This document discloses apparatus and methods related to pipeline freespan support. FIG. 1 shows an implementation of the apparatus and methods for pipeline freespan support. The freespan support comprises an upper structure 11 and a tower structure 12, which are further illustrated in FIG. 2 and FIG. 3, respectively. The upper structure has four legs 21. The lower structure 12 has four posts 31, which can be inserted into the four legs 21 of the upper structure 11, and locked by pins 14A, 1413, 14C and 14D. During installation, the upper structure 11 and lower structure 12 are first integrated into one structure. After the integrated structure is landed on the sea floor, the locking pins 14 can be removed, and the upper structure 11 is then retrieved back to surface, white the lower structure 12 stays on the sea floor to provide support to the pipeline.

Figure 2:
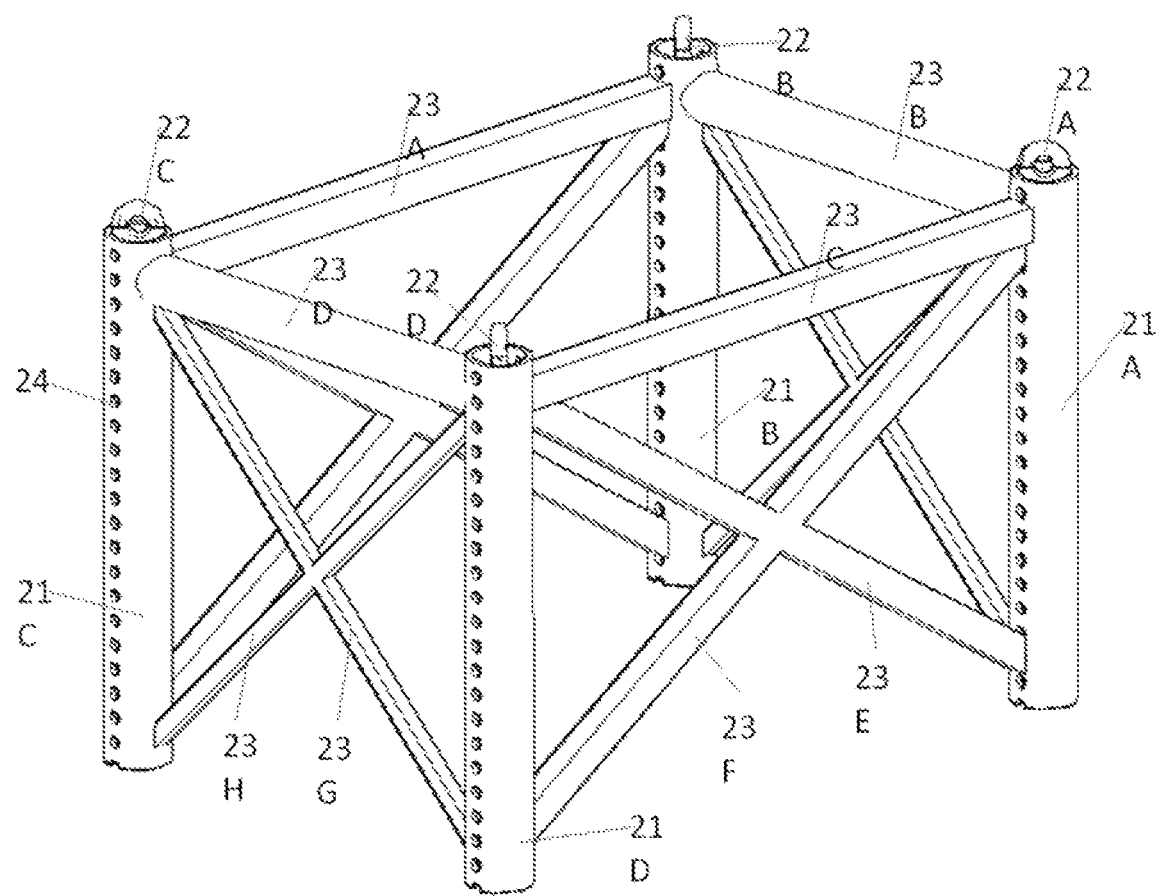
FIG. 2 is a diagram showing the zoomed-in view of an embodiment of the upper structure of the pipeline freespan support.

FIG. 2 shows the zoomed-in view of an implementation of the upper structure of the pipeline freespan support. The upper structure has four legs 21A, 21B, 21C, and 21D, four padeyes 22A, 22B, 22C, 22D, and a plurality of bracing members 23A, 23B, . . . , 23H. A plurality of through holes 24 can be vertically arranged on each of the four legs 21A, 21B, 21C and 21D.

Figure 3:
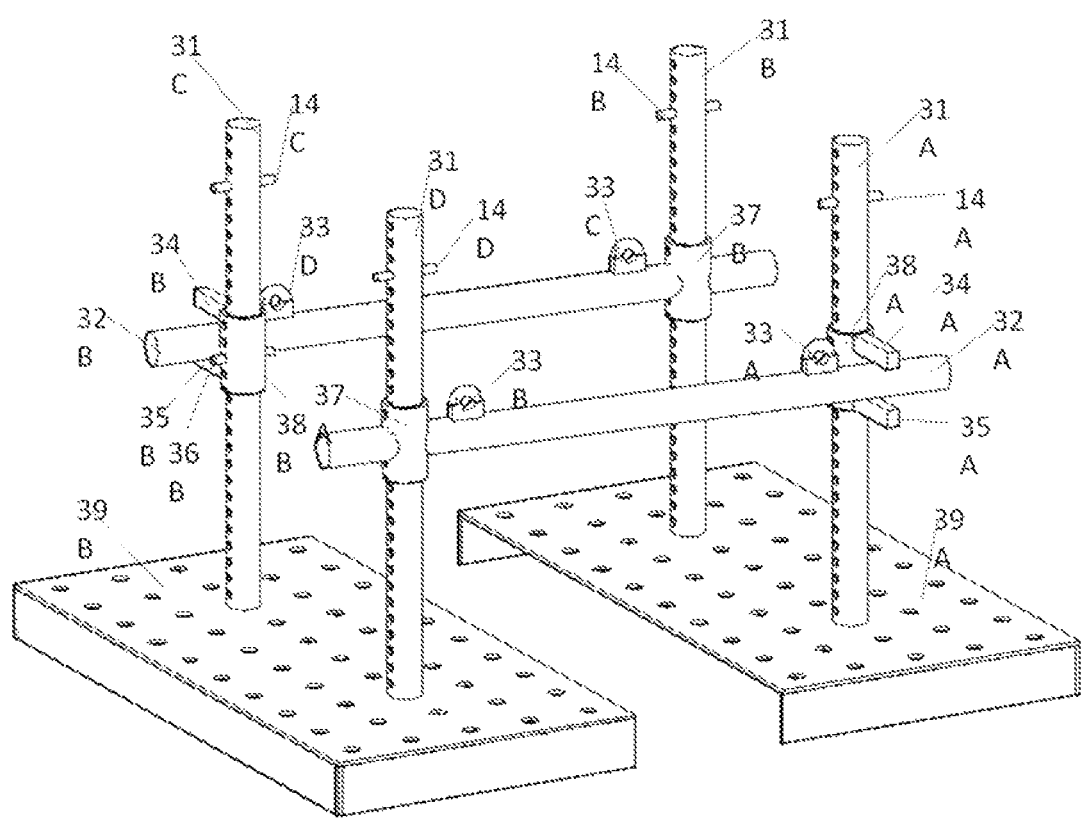
FIG. 3 is a diagram showing the zoomed-in view of an embodiment of the lower structure of the pipeline freespan support.

FIG. 3 shows the zoomed-in view of an implementation of the lower structure of the pipeline freespan support. The lower structure has two spaced mud mats 39A and 39B that will rest on seabed. Each mud mad 39 has two posts 31 standing on it, and can have spaced holes for conveniently positioning the posts. A plurality of through holes 24 can be vertically arranged on each of the four posts 31A, 31B, 31C and 31D. Two kinds of sheath, 37 and 38, wrap around the four posts, with the same kind facing each other diagonally. Two horizontal arms 32A and 32B can slide along sheath 38, which has two teeth 34 and 35, forming an open passage for the horizontal arm 32 to slide along. A locking mechanism can be added to the two teeth 34 and 35 so that the horizontal arm 32 can be locked in place after it rotates into the space between the two teeth 34 and 35. The other end of the horizontal arm 32 can rotate around the post 31 through sheath 37, which has a hole through which the arm can slide along, and can also have a mechanism to fix the position of the horizontal arm 32 relative to the sheath 37 once the desired position is reached. The position of the sheath 37 or 38 can be fixed on the post 31 by a locking pin, such as 36B. Each horizontal arm 32 can also have two padeyes 33A, 33B, 33C, and 33D, which can be used to raise the horizontal arm 32 along the posts 31.

In some implementations, the freespan support can be about three to four meters in height, four meters in width, and four meters in length. In some other implementations, the freespan support can replace the locking pins by other locking mechanism, such as ratchet.

Figure 4:
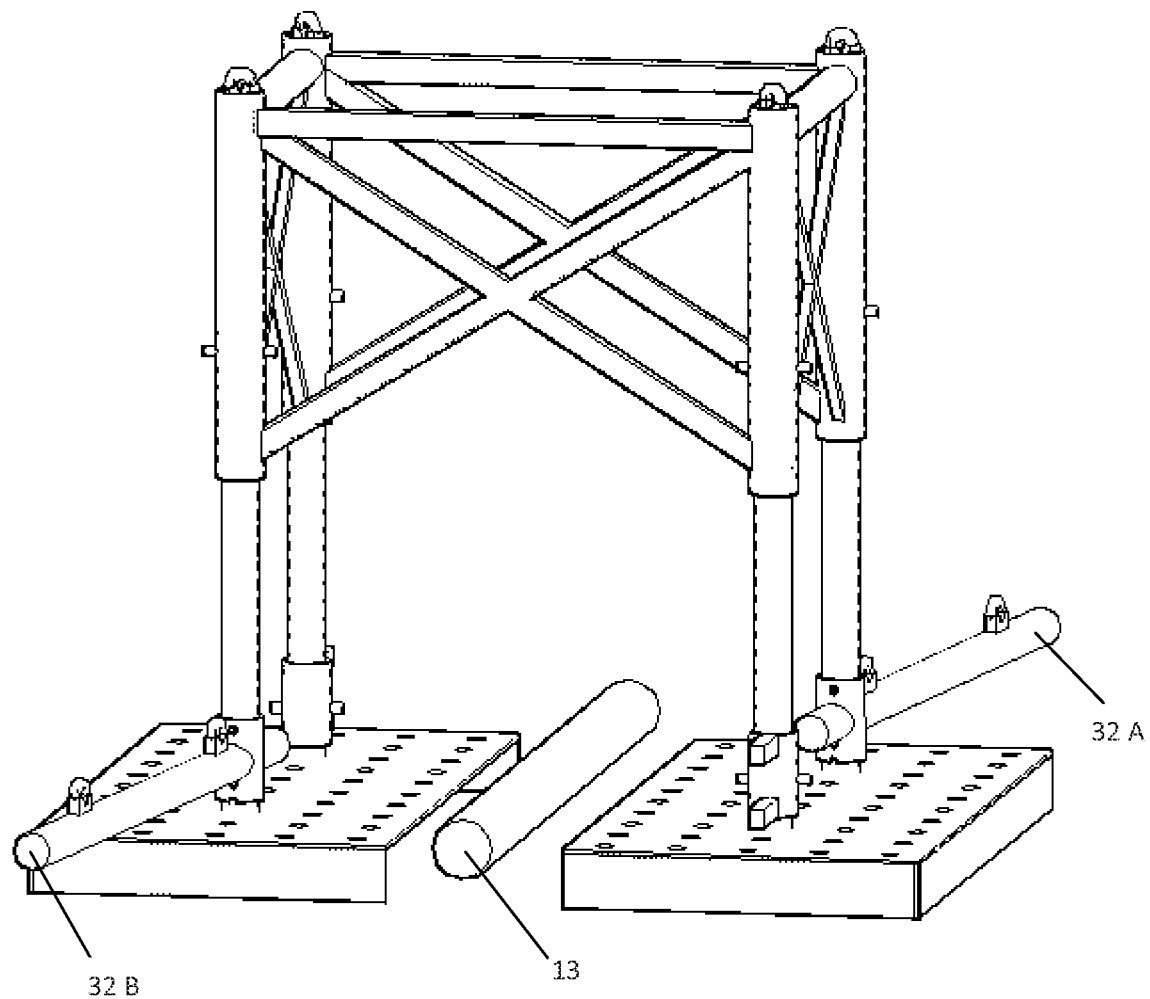
FIG. 4 is a diagram showing the integrated upper and lower structure of the pipeline freespan support being lowered over a pipeline so that the pipeline becomes contained within the lower structure, and the two horizontal arms in open positions.
Figure 5:
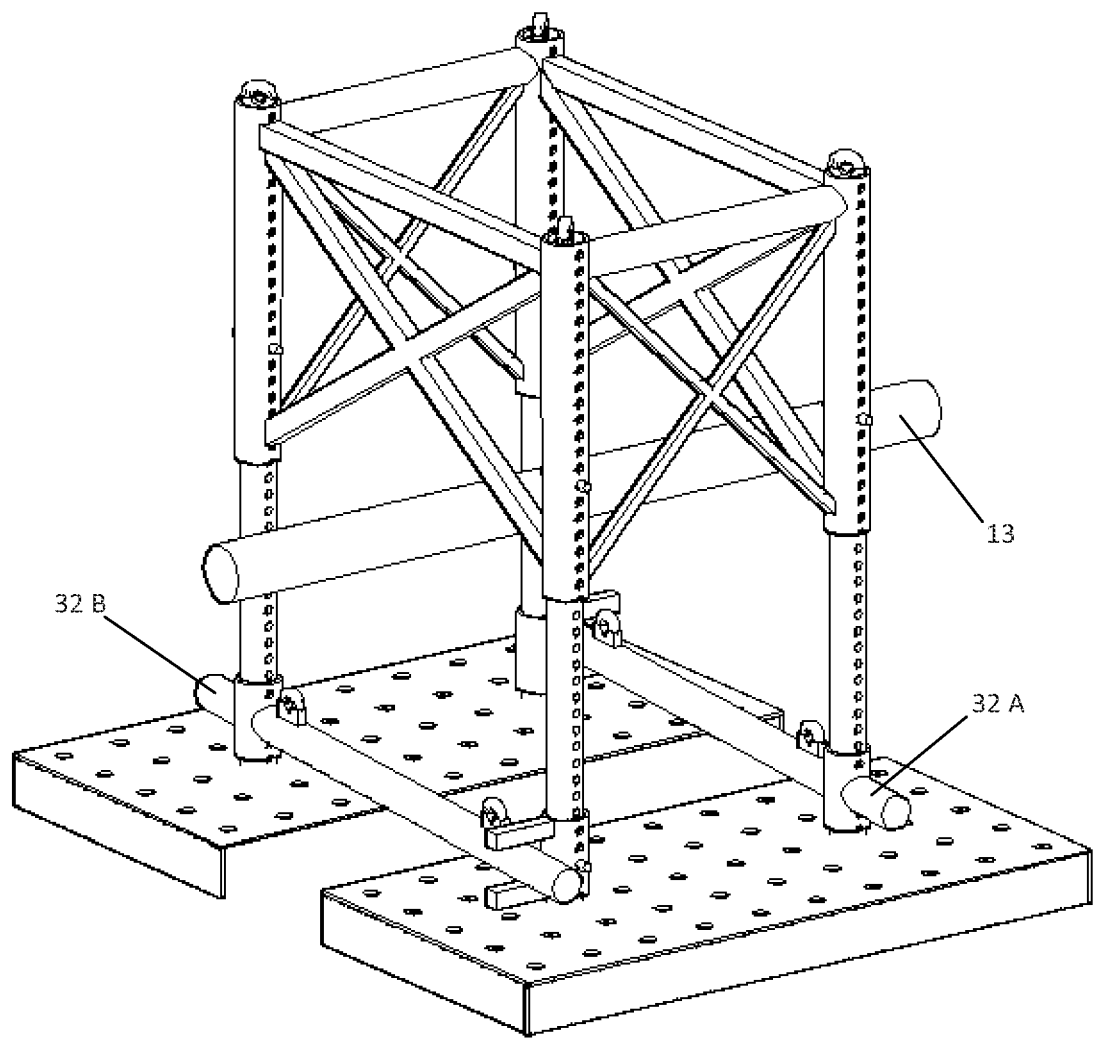
FIG. 5 is a diagram showing the integrated upper and lower structure of the pipeline freespan support being rested on the sea floor, with the pipeline contained within the space of the lower structure, and the two horizontal arms attached to the lower structure having rotated into a locking position.
Figure 6:
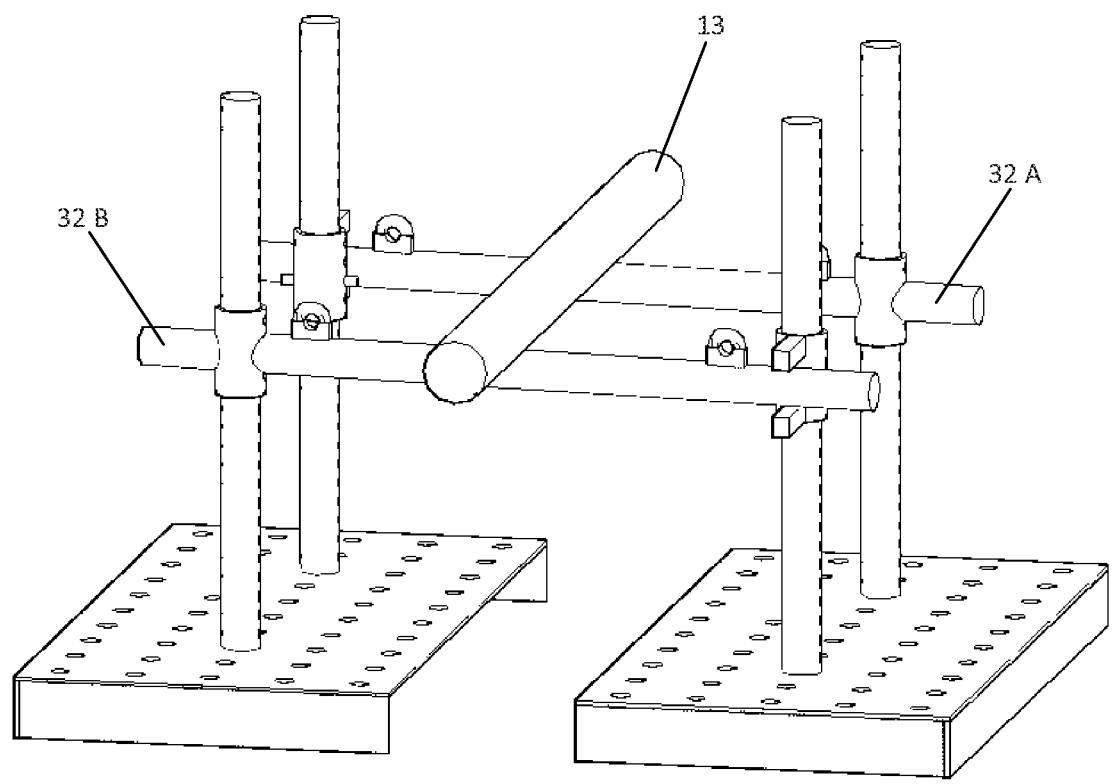
FIG. 6 is a diagram showing the upper structure of the pipeline freespan support has been removed, and the two horizontal arms have been raised to support the pipeline.

In some implementations, the freespan support structure can be installed as shown in FIGS. 4 through 6, and as follows: (i) position the lower structure 12 on deck, mount the upper structure 11 onto the lower structure 12, adjust the upper structure elevation such that its center elevation is about one meter (or a different dimension as needed) higher than the pipeline freespan height from seabed, lock the upper structure 11 on the lower structure 12 through locking pins 14 to form an integrated structure, and leave a gap about one to two meters in width (or a different dimension as needed) between the two mud mats 39; (ii) lift the integrated structure and lower it over the pipeline, ensuring the horizontal arms remain open during the lowering process; (iii) land the integrated structure over the pipeline such that the pipeline is at the center of the freespan support; (iv) rotate and lock the horizontal arms 32; (v) remove the locking pins 14 and retrieve the upper structure 11 to deck, leaving the lower structure 12 on the sea floor; (vi) attach lifting riggings on the padeyes 33 on the horizontal arms 32, and lift the horizontal arms 32 up until both arms are in contact with the pipeline and provide suitable support; and (vii) secure the horizontal arms in position by fixing the sheaths on the posts using, for example, through holes and locking pins. This sequence of installation above can be reversed as appropriate for uninstallation.

OTHER EMBODIMENTS

Various other adaptations and combinations of features of the embodiments and implementations disclosed are within the scope of the present disclosure. It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An apparatus for pipeline freespan support, comprising:
an upper structure, comprising:
four round legs connected to one another by bracing members; and
attachment points through which the upper structure is lifted; and
a lower structure, comprising:
four round posts dimensioned to insert into the four round legs of the upper structure;
two spaced mud mats on which the posts stand;
first and second sheaths that fit around two of the posts, the first and the second sheaths being rotatable around the two round posts and translatable along the two round posts;
first and second horizontal arms attached to the first and the second sheaths, respectively, so each horizontal arm is rotatable about a corresponding post and translatable along the corresponding post; and
third and fourth sheaths that fit around other two of the posts, the third and the fourth sheaths being translatable along the other two posts, the third and the fourth sheaths comprising teeth dimensioned to receive the first and the second horizontal arms, respectively.

2. The apparatus according to claim 1, wherein the posts have vertically arranged first through holes.

3. The apparatus according to claim 2, wherein the legs have vertically arranged second through holes.

4. The apparatus according to claim 3, further comprising locking pins, wherein the posts are inserted in to the legs and locked therewith using the locking pins.

5. The apparatus according to claim 2, further comprising locking pins, wherein the sheaths have second through holes and are locked with the posts using the locking pins.

6. The apparatus according to claim 1, wherein the attachment points are padeyes at the top of the legs.

7. The apparatus according to claim 1, wherein the mud mats have spaced holes for conveniently positioning the posts.

8. The apparatus according to claim 1, wherein the sheaths can adapt for the rotating and sliding of the horizontal arms.

9. The apparatus according to claim 1, wherein the first and the second horizontal arms have attached padeyes that can be used for lifting the horizontal arms together with the sheaths.

10. A method for providing support at a pipeline at a freespan location, comprising:

providing a lower structure comprising:
four round posts;
two spaced mud mats on which the posts stand;
first and second sheaths that fit around two of the posts, the first and the second sheaths being rotatable around the two round posts and translatable along the two round posts;
two horizontal arms that are attached to the first and the second sheaths, respectively, so each horizontal arm is rotatable about the a corresponding post and translatable along the corresponding post; and
third and fourth sheaths that fit around other two of the posts, the third and the fourth sheaths being translatable along the other two posts, the third and the fourth sheaths comprising teeth dimensioned to receive the first and the second horizontal arms, respectively;

providing a upper structure comprising:
four round legs connected to one another by a plurality of bracing members, wherein the posts of the lower structure is dimensioned to insert into the legs; and
attachment points through which the upper structure can be lifted;

placing the lower structure on a platform;

lowering an upper structure onto the lower structure at an appropriate height, wherein the posts of the lower structure are inserted into the legs of the upper structure;

locking the upper structure and lower structure together with first lock pins that inserted into first through holes in the legs and the posts to form an integrated structure;

lowering the integrated structure over the pipeline at the freespan location, with the horizontal arms in open position, allowing the pipeline to pass through an opening between the two mud mats, and landing the integrated structure on an underwater floor;

rotating the horizontal arms into the teeth of the third and the fourth sheaths;

unlocking the upper structure from the lower structure by removing the first locking pins, retrieving the upper structure to surface, and leaving the lower structure on the underwater floor; and lifting the horizontal arms until both arms are in contact with the pipeline and providing suitable support, and fixing the horizontal arms in the supporting position with second locking pins that insert into second through holes in the first and the second sheaths and the posts.

* * * * *